United States Patent [19]

Stawitz

[11] Patent Number: 4,520,202
[45] Date of Patent: May 28, 1985

[54] PROCESS FOR PREPARING 4,4'-DIBENZOLYLAMINODIAN-THRIMIDE CARBAZOLE

[75] Inventor: Josef Stawitz, Cologne, Fed. Rep. of Germany

[73] Assignee: Bayer Aktiengesellschaft, Leverkusen, Fed. Rep. of Germany

[21] Appl. No.: 445,292

[22] Filed: Nov. 29, 1982

[30] Foreign Application Priority Data

Dec. 9, 1981 [DE] Fed. Rep. of Germany ....... 3148695

[51] Int. Cl.³ .......................................... C07D 209/80
[52] U.S. Cl. .................................................. 548/416
[58] Field of Search ........................................ 548/416

[56] References Cited

U.S. PATENT DOCUMENTS 1,550,504  11/1977  Schmidt .............................. 548/316
3,230,232  1/1966   Carr .................................... 548/316

FOREIGN PATENT DOCUMENTS 1085991  7/1960  Fed. Rep. of Germany .
1191061  4/1965  Fed. Rep. of Germany .
7735347  6/1978  France .

OTHER PUBLICATIONS

Houben-Weyl, Band 7, Teil III, 4. Auflage, Chinone, Georg Thieme Verlag, Stuttgart, DE.

*Primary Examiner*—Robert W. Ramsuer
*Attorney, Agent, or Firm*—Sprung Horn Kramer & Woods

[57] ABSTRACT

Process for preparing 4,4'-dibenzoylaminoanthrimidecarbazole, characterized in that 4,4'-diaminodianthrimide is benzoylated and carbazolated, both steps being carried out in one-vessel fashion and the 4,4'-diaminodianthrimide having been obtained by oxidizing a mixture of 1-aminoanthraquinone and 1,4-diaminoanthraquinone in a molar ratio of 0.9:1 to 1.4:1 in 30 to 60% strength $H_2SO_4$ and then reducing.

8 Claims, No Drawings

PROCESS FOR PREPARING 4,4'-DIBENZOYLAMINODIANTHRIMIDE CARBAZOLE

The invention relates to a process for preparing 4,4'-dibenzoylaminodianthrimidecarbazole, characterised in that 4,4'-diamino-1,1'-dianthrimide is benzoylated and carbazolated, both steps being carried out in one-vessel fashion and the 4,4'-diaminodianthrimide having been obtained by oxidising a mixture 1-aminoanthraquinone and 1,4-diaminoanthraquinone in a molar ratio of 0.9:1 to 1.4:1 in 30 to 60% strength $H_2SO_4$ and then reducing in a manner which is in itself known.

It is advisable to use a finely divided mixture of aminoanthraquinones in preparing 4,4'-diaminoanthrimide.

The mixture is generally oxidised at temperatures of about 0° to about 80° C., preferably at about 30° to about 60° C.

The oxidation is effected with customary oxidising agents, such as oxygen-donating heavy metal salts or heavy metal oxides or peroxodisulphates, peroxosulphates or hydrogen peroxide or mixtures of these compounds.

Examples which may be mentioned are $MnO_2$, $KMnO_4$, $CrO_3$ $K_2Cr_2O_7$, $Na_2Cr_2O_7$, alkali metal peroxodisulphates, chloric acid, chlorates, ammonium peroxodisulphate and hydrogen peroxide.

Potassium peroxodisulphate is preferably used.

4,4'-Diaminodianthrimide can be prepared essentially by two processes:

1. Condensation of 1-chloroanthraquinone with 1-aminoanthraquinone under copper catalysis in accordance with an Ullmann reaction (Ullmann's Enzyklopädie der technischen Chemie [Ullmann,s Encyclopaedia of Industrial Chemistry], Volume 7, page 585, 3rd Edition, 1974), nitration of the dianthrimide formed, which is unsubstituted in the 4,4'-position, in borosulphuric acid, and reduction of the 4,4'-dinitroanthrimide obtained and
2. condensation of 4-benzoylamino-1-chloroanthraquinone with 1-amino-4-benzoylaminoanthraquinone under copper catalysis, and hydrolysis of the benzoylamino groups in accordance with the process of Swiss Patent Specification No. 573,959.

The oxidation of a mixture of 1,4-diaminoanthraquinone and 1-aminoanthraquinone, to give 4,4'-diaminodianthrimide, is known from Houben/Weyl (Volume 7, Part 3, page 213, 4th Edition). According to this reference, the dianthrimide forms when the components mentioned are treated with manganese dioxide in 85 to 96% strength $H_2SO_4$. Repetition of this work shows that precisely in highly concentrated $H_2SO_4$ the reaction does not proceed at all or does so only with an extremely unsatisfactory result in respect of yield and quality of the final product.

Surprisingly, it is possible by means of the process according to the invention to prepare, in a short time, 4,4'-diaminodianthrimide of high purity in good yields.

It is particularly surprising
(a) that the hydrolysis-sensitive anthraquinone-1,4-diimine formed as an intermediate under the oxidising conditions reacts almost quantitatively in aqueous $H_2SO_4$ with 1-aminoanthraquinone to give 4,4'-diaminodianthrimide;
(b) that, under the reaction conditions, the dianthrimide already formed, or its quinone-imine, is hydrolysed, if at all, only to a very small degree to give 1,4-diaminoanthraquinone and 4-amino-1-hydroxyanthraquinone; and
(c) that the competing reaction of a self-condensation of 1-aminoanthraquinone to give aminotrianthrimides or aminopolyanthrimides in accordance with German Auslegeschrift No. 1,085,991 takes place, if at all, only to a very small extent.

4,4'-Diaminodianthrimide produces the dyestuff C.I. Vat Black 27 (C.I. 69,005)
(a) by benzoylating in nitrobenzene and carbazolating the isolated dibenzoylaminodianthrimide in concentrated $H_2SO_4$ in accordance with BIOS 1493, page 31; and
(b) by benzoylating in 20% strength oleum and carbazolating by diluting to 96% strength $H_2SO_4$ in a one-vessel process in accordance with U.S. Pat. No. 3,230,232.

C.I. Vat Black 27 is obtained in the process according to the invention in excellent yields and in a quality which is considerably better than when diaminodianthrimide prepared by customary processes, for example by nitrating and reducing dianthrimide, is used. For instance, the IR reflectance, which is critical for the quality of the dyestuff, is markedly improved.

Using the process according to the invention and starting from 1-aminoanthraquinone and 1,4-diaminoanthraquinone, the dyestuff C.I. Vat Black 27 is obtained in high quality in two reaction stages using method (b), while at least four stages are necessary in known processes. Although the dyestufff can also be prepared, via the condensation of 4-benzoylamino-1-chloroanthraquinone and 1-amino-4-benzoylaminoanthraquinone, in a two-stage process, the starting products mentioned must first be prepared expensively from 1-aminoanthraquinone and 1,4-diaminoanthraquinone, which are used directly in the process according to the invention, by benzoylation and chlorination, or benzoylation and hydrolysis.

The new process is thus far superior to known processes in its simplicity, the short length of the route and the fact that it is possible to work without organic solvents.

About 1.0 to about 2.5 mol of oxidising agent, preferably 1.5 mol to 2.1 mol of oxidising agent, are preferably used in the process according to the invention per mol of 1,4-diaminoanthraquinone.

In the preparation of 4,4'-diaminodianthrimide, the known reducing agents effective in a medium containing sulphuric acid, such as $SnCl_2$, $FeSO_4$, $SO_2$, dihydroxybenzenes, trihydroxybenzenes, alkali metal salts of the oxo and thio acids of low-valent sulphur and the oxygen acids of phosphorus of low oxidation states, and their salts, can be used for the reduction. Preferable reducing agents, which are used singly or mixed, are $SO_2$, $Na_2SO_3$, $NaHSO_3$, $FeSO_4$ and $H_3PO_3$ and its alkali metal salts. Heating is advantageous to complete the reduction.

Using the process according to the invention a suspension of finely ground 1-aminoanthraquinone and 1,4-diaminoanthraquinone in 30 to 60% strength $H_2SO_4$ can be oxidised. The 1-aminoanthraquinone and the 1,4-diaminoanthraquinone are preferably pasted in succession, but, for economic reasons, very particularly preferably pasted conjointly, since this procedure does not have any disadvantages in respect of the quality of the products.

In a particularly economical variant of the process claimed, leuco-1,4-diaminoanthraquinone is oxidised in concentrated sulphuric acid in accordance with German Patent Specification No. 627,482 to give 1,4-diaminoanthraquinone, which in then pasted without intermediate isolation conjointly with 1-aminoanthraquinone.

In preparing 4,4'-diaminodianthrimide the oxidation in 45-55% strength $H_2SO_4$ is particularly preferable.

The oxidising agent can be initially introduced in water or in a sulphuric acid/water mixture, and the mixture containing sulphuric acid can be added dropwise to the aminoanthraquinones. However, the oxidising agent is advantageously metered in continuously or in portions to the paste of the aminoanthraquinones.

The reaction of 1,4-quinoneimine with 1-aminoanthraquinone usually takes place rapidly even at a low temperature. For economic reasons, and for reasons of stirrability—in particular when a concentrated reaction batch is made up—a reaction at a temperature of 10° to 80° C., in particular 30°-50° C., is preferable.

The benzoylation is effected by customary methods. The reaction is preferably carried out in 10-30% strength, preferably 20% strength, oleum using benzoic anhydride, benzoyl chloride or, preferably, benzoic acid, at about 20° to about 50° C., particularly preferably at 35° to 45° C.

The reaction batch is diluted to 90-98% strength, preferably 96-98% strength, $H_2SO_4$ for the carbazolation. The carbazolation is preferably carried out at 20° to 60° C., particularly preferably at 30° to 50° C.

EXAMPLE 1

(a) 52.0 g of 1,4-diaminoanthraquinone (92% pure) and 47.0 g of 1-aminoanthraquinone (98% pure) are dissolved in 512 g of 96% strength $H_2SO_4$, and the solution is added dropwise with thorough stirring and cooling to 460 g of water in such a way that the temperature does not exceed 40°-50° C. After the batch has been cooled down to about 15° C., 110.0 g of potassium peroxodisulphate are added with thorough stirring within 3-4 hours and, during the addition, the temperature is gradually allowed to rise to about 20° C. After 2-3 hours at 20° C., 80 ml of 40% strength $NaHSO_3$ solution are added dropwise with thorough stirring, 15.0 g of $FeSO_4.7H_2O$ are also added, and the mixture is heated to 80° C. within 30 minutes and maintained for 1 hour at this temperature. The product is filtered off hot with suction, washed with water until neutral and dried at 100° C. In this way 98.1 g of 4,4'-diaminodianthrimide (82% pure), corresponding to 87% of theory, are obtained. The oxidising agent potassium peroxodisulphate can be replaced partially or completely by heavy metal oxides, such as manganese dioxide, without disadvantage for quality and yield, using otherwise the identical procedure.

(b) 30.0 g of the dianthrimide prepared according to a) are added at 25°-30° C. to 230 g of 20% strength oleum, and the mixture is stirred for 30 minutes. 25.0 g of benzoic acid are then added, the melt is heated for 3 hours to 40° C., a further 2.0 g of benzoic acid are added, and the batch is heated for a further hour at 40° C. After the batch has been cooled down to 5°-10° C., 16 ml of water are added dropwise in such a way that the temperature increases to 45°-50° C., where the carbazolation, if appropriate after addition of a trace of reducing agent, sets in with an increase in temperature to 55°-60° C. The melt is stirred for 3 hours until cold and then stirred into 600 ml of water. The mixture is heated for 30 minutes at 70° C. with the addition of 40 ml of chlorine liquor (which contains approximately 13% of active chlorine), and the solids are filtered off hot with suction, washed with hot water until neutral and dried at 100° C. 37.2 g of a dark powder which dyes cotton in a deep olive, like the obtained dyestuff C.I. Vat Black 27, are obtained.

EXAMPLE 2

Chlorine is passed at 100° C. into a solution of 52.0 g of leuco-1,4-diaminoanthraquinone (94%) in 410 g of 96% strength $H_2SO_4$ until the leuco compound has just disappeared. Excess chlorine as well as hydrogen chloride is expelled by means of air. The batch is then allowed to cool down to room temperature, during which time 48.0 g of 1-aminoanthraquinone (98%) are added, and the mixture is then added dropwise to 410 g of water. 95.0 g of potassium peroxodisulphate are added in portions in the course of about 1 hour at 40°-50° C. to the paste. Stirring is allowed to continue for about 30 minutes at 30°-50° C., and the solids are filtered off with suction and washed with water until almost neutral. The press cake is washed with 300 ml of 10% strength $NaHSO_3$ solution, and then with water, and dried at 100° C. 102.3 g of 4,4'-diamino-1,1'-dianthrimide (79% pure) are obtained; this result corresponds to 87% of theory.

The leuco-1,4-diaminoanthraquinone can be oxidised using sulphuryl chloride, manganese dioxide or bromine-containing air in otherwise the same procedure without disadvantage for quality and yield.

The benzoylation and carbazolation of 30.0 g of the 4,4'-diamino-1,1'-dianthrimide thus obtained, in a one-vessel process in accordance with Example 1, produce 39.8 g of a dyestuff which has the same hue and the same high IR reflectance as the dyestuff obtained according to Example 1.

EXAMPLE 3

52.0 g of 1,4-diaminoanthraquinone (92% pure) and 47.0 g of 1-aminoanthraquinone (98% pure) are dissolved in 420 g of 96% strength $H_2SO_4$, and the melt is added dropwise with thorough stirring and cooling to 590 ml of water in such a way that the temperature does not exceed 40°-50° C. After the batch has been cooled down to 15° C., 110.0 g of potassium peroxodisulphate are added in portions with thorough stirring in the course of 3-4 hours. The temperature of the reaction batch is then allowed to increase to 20° C., and stirring is continued for a further 2-3 hours at this temperature. 200 ml of 40% strength $NaHSO_3$ solution are then added dropwise at room temperature, and the mixture is heated to 80° C. over 30 minutes and maintained for 1 hour at this temperature. The product is filtered off hot with suction and washed with water until neutral. After drying, 96.0 g of 4,4'-diaminodianthrimide (75% pure) are obtained; this result corresponds to 78% of theory.

The benzoylation and carbazolation of 30.0 g of the 4,4'-diaminoanthrimide thus obtained, in the one-vessel process in accordance with Example 1, produce 33.6 g of a dyestuff which dyes somewhat more brown than the dyestuff obtained according to Example 1 and has, moreover, a changed IR reflectance.

EXAMPLE 4

52.0 g of 1,4-diaminoanthraquinone (92% pure) and 47.0 g of 2-aminoanthraquinone (98% pure) are dissolved in 400 g of 96% stength $H_2SO_4$, and the solution is added dropwise with thorough stirring and cooling to 400 g of 60% strength H$_2$SO$_4$ and 240 g of water. After the batch has been cooled down to 15° C., 1.0 g of manganese dioxide and then, in the course of 3–4 hours, 110.0 g of potassium peroxodisulphate are added with thorough stirring. The batch is stirred for 3 hours at 20° C., 200 ml of 40% strength NaHSO$_3$ solution are then added dropwise at room temperature, and the mixture is heated to about 80° C. for 1.5 hours. The solids are filtered off hot with suction, washed with water until neutral and dried at 100° C. 91.2 g of 81% pure 4,4'-diaminodianthrimide are obtained; this result corresponds to 80% of theory.

The benzoylation and carbazolation of 30.0 g of the diaminodianthrimide thus obtained, in a manner corresponding to the process of Example 1, produce 37.4 g of a dyestuff which, in hue and tinctorial strength, corresponds to the dyestuff of Example 1 and has an only slightly changed IR reflectance.

I claim:

1. Process for preparing 4,4'-dibenzoylaminoanthrimidecarbazole, characterised in that 4,4'-diaminodianthrimide is benzoylated and carbazolated, both steps being carried out in one-vessel fashion and the 4,4'-diaminodianthrimide having been obtained by oxidising a mixture of 1-aminoanthraquinone and 1,4-diaminoanthraquinone in a molar ratio of 0.9:1 to 1.4:1 in 40 to 60% strength H$_2$SO$_4$ and then reducing.

2. Process according to claim 1, characterised in that a finely divided mixture of the anthraquinones is used.

3. Process according to claim 1, characterised in that a molar ratio of 1-aminoanthraquinone to 1,4-diaminoanthraquinone of 1:1 to 1.1:1 is used.

4. Process according to claim 1, characterised in that the oxidation is carried out in 45–55% strength H$_2$SO$_4$.

5. Process according to claim 1, characterised in that the oxidation is carried out using an oxygen-donating heavy metal salt or heavy metal oxide, in particular manganese dioxide.

6. Process according to claim 1, characterised in that the oxidation is carried out using a peroxosulphate or peroxodisulphate, in particular potassium peroxodisulphate, or hydrogen peroxide.

7. Process according to claim 1, characterised in that SO$_2$, Na$_2$SO$_3$, NaHSO$_3$, FeSO$_4$ or H$_3$PO$_3$, or its alkali metal salts, or mixtures of these reducing agents are used for the reduction.

8. Process according to claim 1, characterised in that the 1,4-diaminoanthraquinone used is prepared by oxidising leuco-1,4-diaminoanthraquinone in sulphuric acid and reacted without intermediate isolation after pasting with 1-aminoanthraquinone.

* * * * *